United States Patent
Smith et al.

(10) Patent No.: US 12,424,801 B2
(45) Date of Patent: Sep. 23, 2025

(54) SOFTWARE CONTROLLED INTERLOCKING PILOT PIN CONNECTOR SYSTEM

(71) Applicant: STEWART & STEVENSON LLC, Houston, TX (US)

(72) Inventors: Paul Smith, Houston, TX (US); Eric Evezic, Houston, TX (US); Adam Lambertus, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 256 days.

(21) Appl. No.: 18/227,382

(22) Filed: Jul. 28, 2023

(65) Prior Publication Data

US 2024/0055813 A1 Feb. 15, 2024

Related U.S. Application Data

(60) Provisional application No. 63/396,516, filed on Aug. 9, 2022.

(51) Int. Cl.
*H01R 13/703* (2006.01)

(52) U.S. Cl.
CPC ................. *H01R 13/7036* (2013.01)

(58) Field of Classification Search
CPC .............. H01R 13/7036; H01R 13/707; H01R 13/713; H01H 9/26; H02H 7/22; H02J 4/00

USPC ....... 200/51.09, 50.09, 51.1, 51.12; 361/180, 361/42, 102, 601, 605, 607, 152
See application file for complete search history.

(56) References Cited

U.S. PATENT DOCUMENTS

| | | | |
|---|---|---|---|
| 9,762,056 B1* | 9/2017 | Miller | H01R 25/003 |
| 10,404,062 B2* | 9/2019 | Wike | H02J 1/10 |
| 10,644,498 B2* | 5/2020 | Louco | G05B 23/0291 |
| 10,910,776 B2* | 2/2021 | Eriksen | H02H 11/002 |
| 2013/0271879 A1* | 10/2013 | Andersen | H02H 7/261 |
| | | | 361/20 |
| 2017/0184343 A1* | 6/2017 | Freer | H02H 11/00 |
| 2021/0091515 A1* | 3/2021 | Weeks | H01R 13/713 |

* cited by examiner

*Primary Examiner* — William A Bolton
(74) *Attorney, Agent, or Firm* — EWING & JONES, PLLC

(57) ABSTRACT

A power system includes a power supply, a common bus, and two or more receptacles coupled to the common bus. In addition, the power system includes two or more connectors, each connector coupled to a receptacle of the two or more receptacles. The power system further includes a protective breaker coupled to the common bus between the power supply and the receptacles, the protective breaker operated by a protective relay and a low voltage power supply. Further, the power system includes an umbilical cord, the umbilical cord passing from the low voltage power supply to the protective relay through each receptacle and each connector such that the removal of any connector from any receptacle breaks the electrical pathway between the low voltage power supply and the protective relay.

17 Claims, 4 Drawing Sheets

SOFTWARE CONTROLLED INTERLOCKING PILOT PIN CONNECTOR SYSTEM

CROSS-REFERENCE TO RELATED APPLICATIONS

This application is a nonprovisional application which claims priority from U.S. provisional application No. 63/396,516, filed Aug. 9, 2022, which is incorporated by reference herein in its entirety.

TECHNICAL FIELD/FIELD OF THE DISCLOSURE

The present disclosure relates generally to electrical equipment, and specifically to interlocks for electrical systems.

BACKGROUND OF THE DISCLOSURE

When distributing high current electricity, safety to personnel around connections and power transmission devices is a concern. The risk of electrical shock to operators is greatest at startup and when otherwise first energizing components of the system. A time of special concern is immediately after rigging up the system with electrical connections or while disconnecting components without first verifying the system is powered down. Partial or improper connections could create a hazard. Traditional connectors that use a pilot pin for safety operate as an electrical interlock to protect against a case where the connector is disconnected or improperly seated but operate only for the connector and associated cable itself, not for the whole system.

SUMMARY

In the present disclosure, a power system is disclosed. The power system includes a power supply, a common bus, and two or more receptacles coupled to the common bus. In addition, the power system includes two or more connectors, each connector coupled to a receptacle of the two or more receptacles. The power system further includes a protective breaker coupled to the common bus between the power supply and the receptacles, the protective breaker operated by a protective relay and a low voltage power supply. Further, the power system includes an umbilical cord, the umbilical cord passing from the low voltage power supply to the protective relay through each receptacle and each connector such that the removal of any connector from any receptacle breaks the electrical pathway between the low voltage power supply and the protective relay.

The disclosure further provides for a power system. The power system includes a distributed energy resource, the distributed energy resource including an output breaker and a switchgear, the switchgear operatively coupled to the distributed energy resource by a power cable and an interlock cable, the interlock cable in communication with the distributed energy source and the switchgear, the switchgear including an input breaker. The output breaker and the input breaker are opened and closed by turning a key or a controller associated with the output breaker may receive a command to open or close.

The disclosure also includes supplying a distributed energy resource, the distributed energy resource including an output breaker and a switchgear. The switchgear is operatively coupled to the distributed energy resource by an interlock cable, the interlock cable in communication with the distributed energy source and the switchgear. The switchgear includes an input breaker, wherein the output breaker and the input breaker may be opened and closed by turning a key, The distributed energy resource and the switchgear each include a connector keyslot and a breaker keyslot. The method also includes placing the key in each connector keyslot and connecting a power cable to the distributed energy resource and switchgear. In addition, the method includes turning each key and removing each key from the connector keyslots, placing the keys in each breaker key slot, and turning the keys in each breaker key slot.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
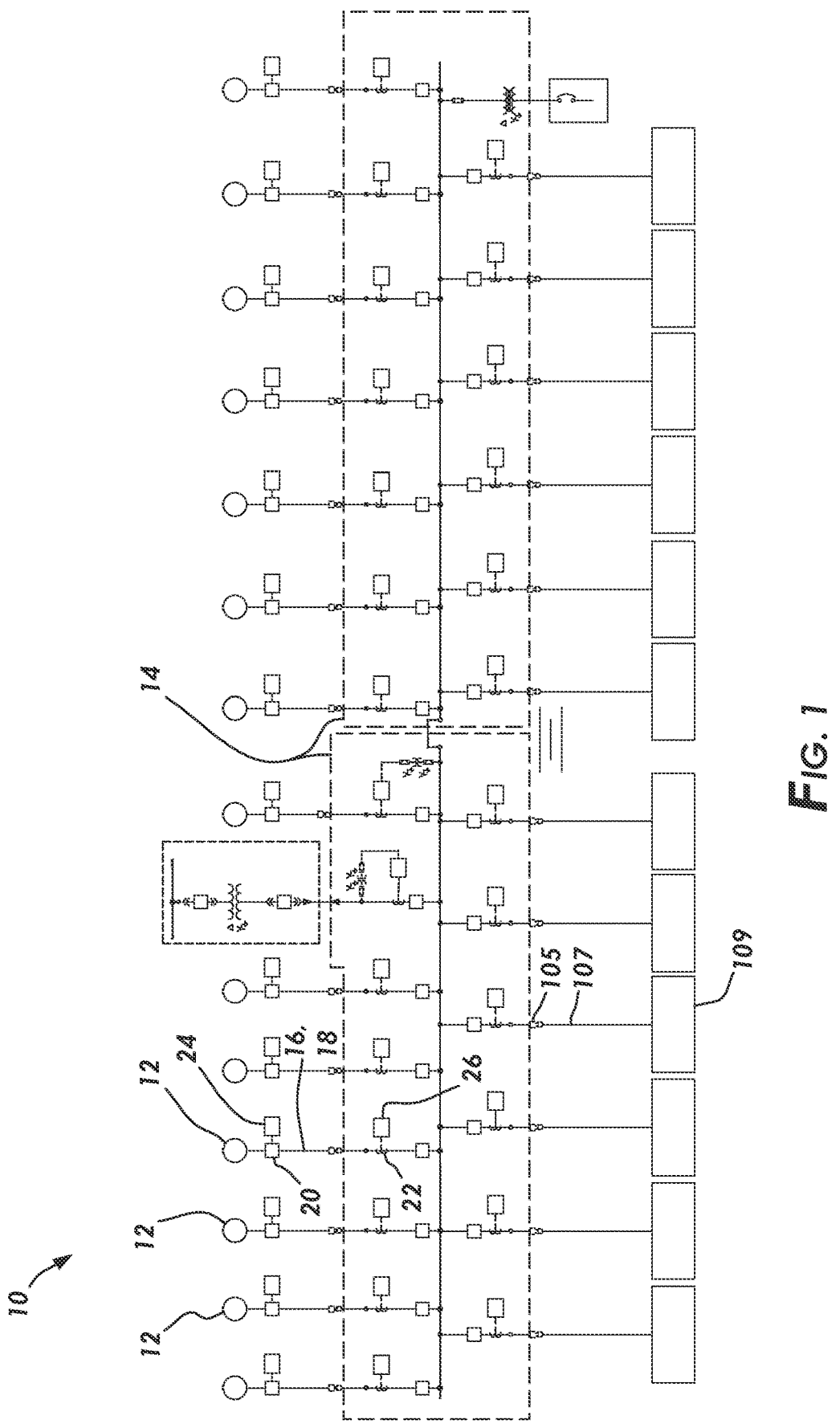
FIG. 1 is an overview of a power distribution system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
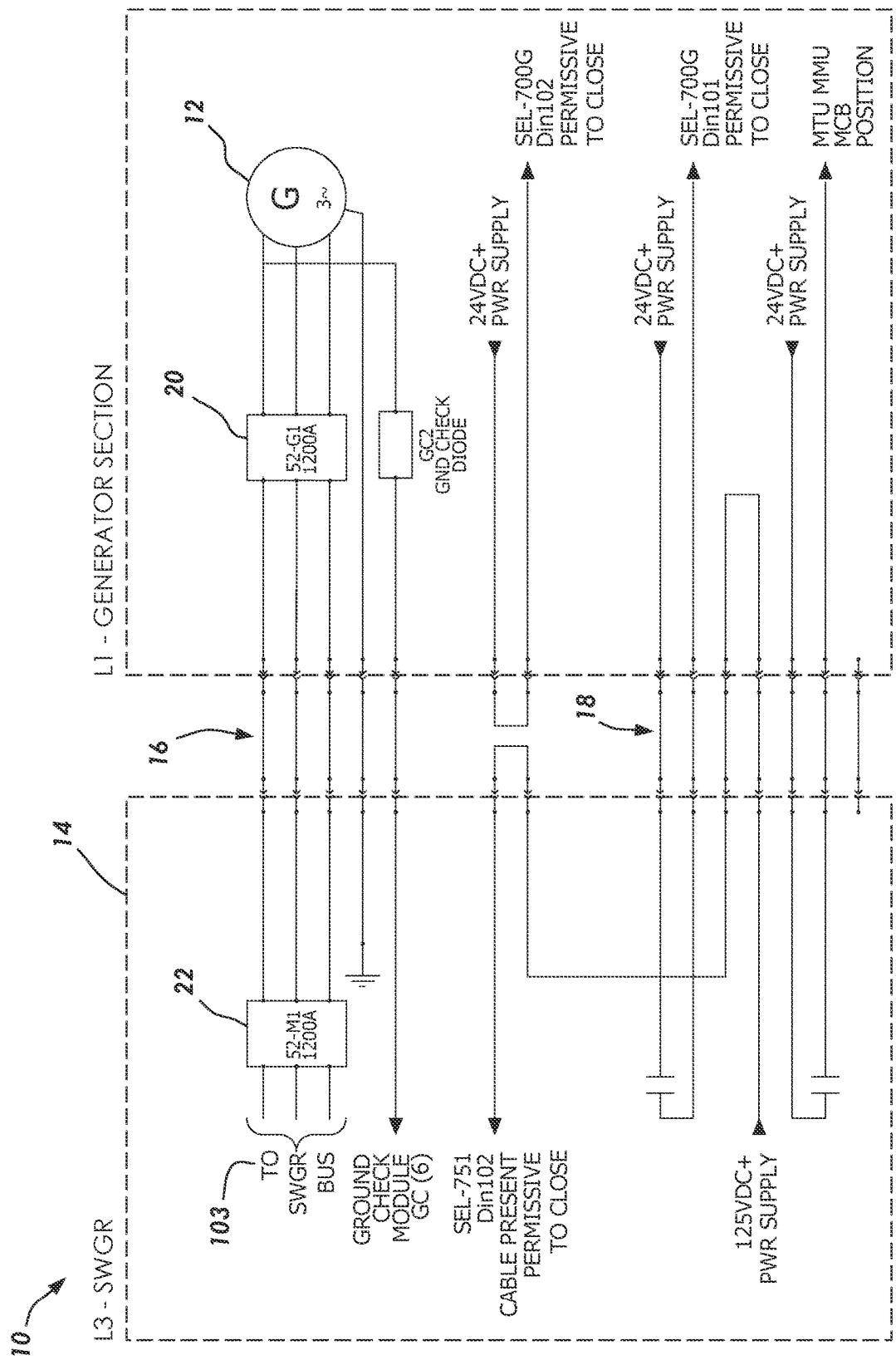
FIG. 2 is a schematic view of a connection between a distributed energy resource and switchgear of the power distribution system of FIG. 1.

FIG. 1 depicts power system 10. Power system 10 includes distributed energy resources 12, which provides power to power system 10 and any connected devices or outputs. Each distributed energy resource 12 may be, for example and without limitation, one or more generators or gensets, energy storage systems, utility interconnects, or other such systems. Distributed energy resource 12 may operatively couple to switchgear 14. Switchgear 14, as understood in the art, may include one or more electrical components designed to control, protect, and isolate electrical power and equipment and may include one or more switches, fuses, circuit breakers, or other such systems. In some embodiments, each distributed energy resource 12 may couple to switchgear 14 by power cable 16 and interlock cable 18. In other embodiments, distributed energy resource 12 may couple to switchgear 14 by power cable 16, which may include the components of interlock cable 18, alone. In other embodiments, multiple cables may be used for these functions. As shown in FIG. 2, interlock cable may, for example and without limitation, provide one or more electrical connections to communicate that each end of interlock cable 18, which may be built into power cable 16, is properly connected to distributed energy resource 12 and switchgear 14. For example, one or more wires of interlock cable 18 may complete circuits when properly coupled to both distributed energy resource 12 and switchgear 14, signaling that such a connection has been properly made.

Figure 3:
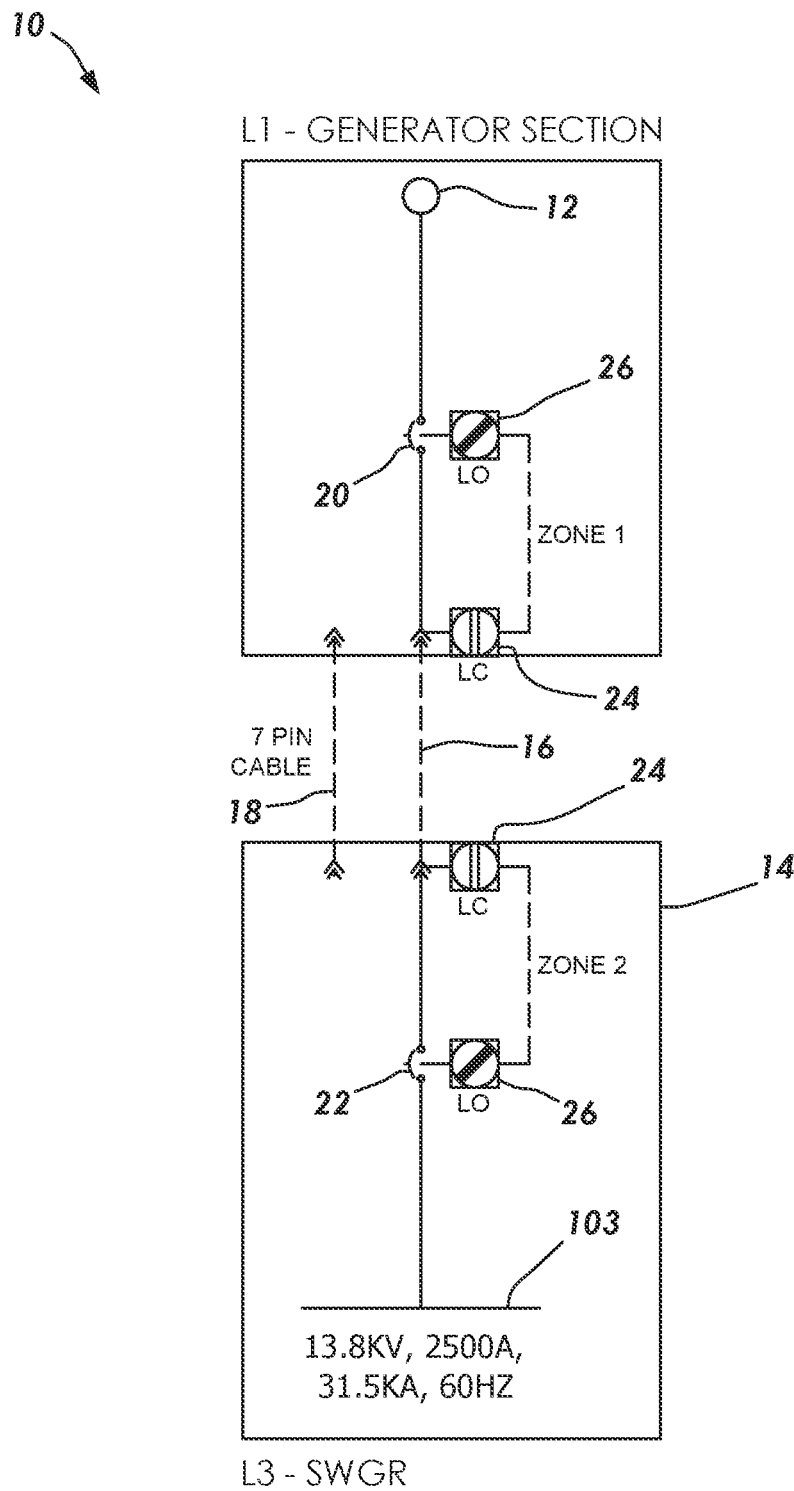
FIG. 3 is a schematic view of an interlock between a distributed energy resource and switchgear consistent with at least one embodiment of the present disclosure.

Interlock cable 18 may be used to operate a key interlock system as shown in FIG. 3. In some such embodiments, distributed energy resource 12 may include output breaker 20, and switchgear 14 may include input breaker 22. Output breaker 20 and input breaker 22 may be opened and closed by physically turning a key, or a controller associated with output breaker 20 may receive permissive commands that output breaker 20 may be opened or closed by physically turning a key as described below.

In some embodiments, each of distributed energy resource 12 and switchgear 14 may include connector keyslot 24 and breaker keyslot 26. In such embodiments, a key may be initially positioned in each connector keyslot 24 that may remain captively turned in that position, unable to be removed until power cable 16 is properly coupled to distributed energy resource 12 and/or switchgear 14. Once power cable 16 or an insulated cover is properly coupled, the locks on connector keyslots 24 are released and allow the keys to be turned and removed from connector keyslots 24. This movement also locks power cable 16 to distributed energy resource 12 and switchgear 14 such that power cable 16 can only be removed by reinserting and turning keys in connector keyslots 24. In some embodiments, the removal of a key from a keyslot 24, 26 may cause a controller associated with output breaker 20 or input breaker 22 to be denied permission to close the associated breaker or causes the opening of output breaker 20 or input breaker 22 to inhibit power flow.

Once removed from connector keyslots 24, the keys may then be moved to breaker keyslots 26 and turned. Turning of the keys in breaker keyslots 26 permits closing of output breaker 20 and input breaker 22, and also captures keys in breaker keyslots 26. The keys cannot be removed from breaker keyslots 26 without opening output breaker 20 and input breaker 22. Because keys are captive, power cable 16 cannot be removed from either distributed energy resource 12 or switchgear 14 without first opening output breaker 20 and input breaker 22, reducing or preventing an operator from accidentally disconnecting power cable 16 without the cable being deenergized.

In some embodiments, with reference to FIG. 2, switchgear 14 may include common bus 103. Common bus 103 may be electrically coupled to distributed energy resource 12 as discussed above and may include one or more outlet receptacles 105 used to receive connectors 107 to provide power to load side equipment 109 as further discussed below. In some embodiments, common bus 103 may include input power receptacles to connect to additional distributed energy resources 12. In some embodiments, common bus 103 may include output power receptacles to connect to additional switchgear, which may provide distributed connections to load resources or may connect to load resources directly.

In some embodiments, power system 10 includes pilot pin interlock system 111. Each outlet receptacle 105 may include one or more interlock pins used to communicate through connectors 107 and load side equipment 109 in order to allow a load side breaker 115 to be closed as further discussed below.

Figure 4:
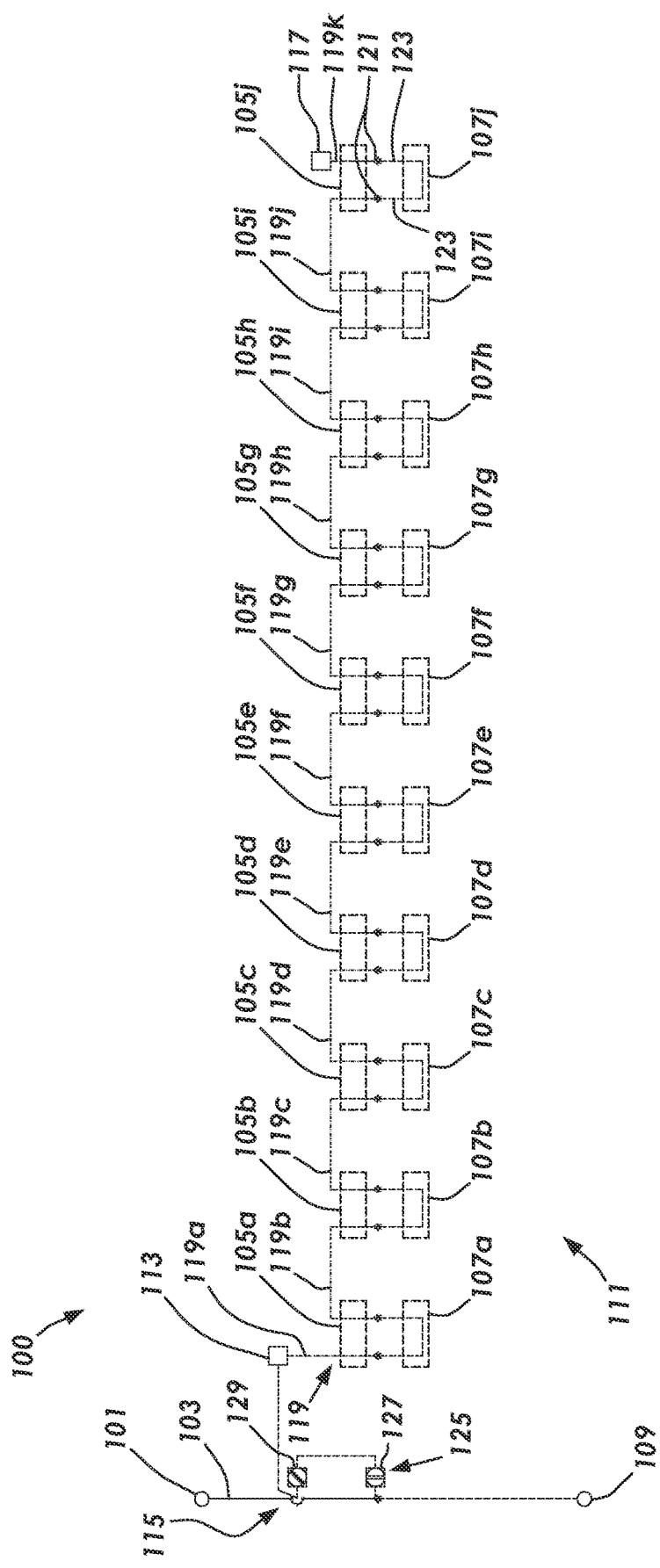
FIG. 4 is a schematic view of a pilot pin interlock system consistent with at least one embodiment of the present disclosure.

In some embodiments, with reference to FIG. 4, power supply 101 is shown and outlet receptacles 105a-j are positioned to receive connectors 107a-j, each connected to an associated load side equipment 109. Power may be supplied from common bus 103 to load side equipment 109 while connectors 107a-j are connected to outlet receptacles 105a-j. Although ten such receptacles, connectors and pieces of load side equipment are discussed and shown, one of ordinary skill in the art with the benefit of this disclosure will understand that power system 10 may be designed to operate with any number of such components.

Pilot pin interlock system 111 may, for example and without limitation, provide for an interlock that prevents or reduces the incidence of power being supplied in the case that one or more of connectors 107a-j is disconnected or improperly seated to the associated outlet receptacle 105a-j.

In some embodiments, pilot pin interlock system 111 may include protective relay 113. Protective relay 113 may be positioned to control load side breaker 115. Load side breaker 115 may be operatively coupled to common bus 103 such that when protective relay 113 is closed, power may be supplied to outlet receptacles 105a-j, and when protective relay 113 is open, power is not supplied to outlet receptacles 105a-j. Load side breaker 115 may be key operated as further described below, but may be selectively opened by protective relay 113 such that load side breaker 115 may be opened regardless of the position of load breaker keyslot 129.

In some embodiments, pilot pin interlock system 111 may include low voltage power supply 117. Low voltage power supply 117 may supply power to umbilical cord 119. Although described as a full cable, umbilical cord 119 is made up of multiple segments of wiring internal to equipment 100. Umbilical cord 119 may operatively couple to each of outlet receptacles 105a-j such that umbilical cord 119 is only a complete circuit when each of connectors 107a-j is properly coupled to a corresponding outlet receptacle 105a-j. In such a case, the low voltage supplied to umbilical cord 119 by low voltage power supply 117 may be sent to protective relay 113, thereby energizing protective relay 113, permitting closing load side breaker 115, and allowing power to be supplied to outlet receptacles 105a-j.

As shown in FIG. 4, umbilical cord 119 may include multiple umbilical cord segments 119a-k, running in series between each of outlet receptacles 105a-j. In some embodiments, each of umbilical cord segments 119a-k may terminate at either end at a corresponding pilot pin receptacle 121 positioned to receive a corresponding pilot pin 123 from each of connectors 107a-j. Each connector 107a-j therefore includes two pilot pins that are electrically coupled together. As shown in FIG. 4, when all of connectors 107a-j are coupled to a corresponding outlet receptacle 105a-j, all umbilical cord segments 119a-k of umbilical cord 119 are connected, thereby allowing a continuous path for low voltage power supply 117 to supply power to protective relay 113, thereby energizing protective relay 113. In the case that any of connectors 107a-j are disconnected or improperly connected to a corresponding outlet receptacle 105a-j, the continuity of umbilical cord 119 is broken, thereby preventing the energizing of protective relay 113, thereby keeping load side breaker 115 open and preventing power supply to outlet receptacles 105a-j.

In some embodiments, pilot pin interlock system 111 may further include captive key interlock 125. Captive key interlock 125 may operate in a similar manner to connector keyslots 24 and breaker keyslots 26 as described above. In the initial configuration, a key may be captively held in connector keyslot 127. Only once connectors 107a-j are properly coupled to outlet receptacles 105a-j is the key in connector keyslot 127 permitted to be rotated and removed. Once connector keyslot 127 is rotated and the key removed therefrom, the key may be inserted into load breaker keyslot 129 and rotated to close load side breaker 115, assuming that protective relay 113 is energized due to the proper connection of each connector 107a-j to outlet receptacle 105a-j, closing load side breaker 115, and allowing power to be supplied to load side equipment 109. Such rotation also locks the key in load breaker keyslot 129. As discussed above, as long as protective relay 113 remains closed and load breaker keyslot 129 is in the closed position, power may be supplied to load side equipment 109. In the case that protective relay 113 is opened, such as, for example and without limitation, due to the removal of one or more connectors 107, load side breaker 115 is opened, cutting off power to load side equipment 109. Likewise, the key may not be positioned in connector keyslot 127 without first opening load side breaker 115 by rotating the key within load breaker keyslot 129 in order to remove it therefrom.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A power system comprising:
a power supply,
a common bus,
two or more outlet receptacles coupled to the common bus;
two or more connectors, each connector coupled to an outlet receptacle of the two or more outlet receptacles;
a protective breaker coupled to the common bus between the power supply and the two or more outlet receptacles, the protective breaker operated by a protective relay;
a low voltage power supply; and
an umbilical cord, the umbilical cord passing from the low voltage power supply to the protective relay through each outlet receptacle and each connector such that a removal of any connector from any outlet receptacle breaks an electrical pathway between the low voltage power supply and the protective relay.

2. The power system of claim 1, wherein power is supplied to load side equipment when the two or more connectors are connected to the two or more outlet receptacles.

3. The power supply of claim 2, wherein the power is supplied from the common bus.

4. The power supply of claim 3, wherein the protective relay is positioned to control a load side breaker.

5. The power supply of claim 4, wherein when the protective relay is closed, power is supplied to the two or more outlet receptacles.

6. The power supply of claim 5, wherein when the protective relay is open, power is not supplied to the two or more outlet receptacles.

7. The power supply of claim 5, further comprising a captive key interlock connected to the two or more connectors.

8. The power supply of claim 7, wherein a key is captively held in a connector key slot.

9. The power supply of claim 8, wherein the key is adapted to be rotated and removed when the two or more connectors are connected to the two or more outlet receptacles.

10. The power supply of claim 9, wherein the key is adapted to be inserted into a load breaker key slot, thereby allowing power to be supplied to load side equipment.

11. The power supply of claim 4, wherein the load side breaker is key operated.

12. The power supply of claim 1, wherein the umbilical cord is comprised of multiple segments of wiring.

13. A power system comprising:
a distributed energy resource, the distributed energy resource including an output breaker;
a switchgear, the switchgear operatively coupled to the distributed energy resource by a power cable and an interlock cable, the interlock cable in communication with the distributed energy source and the switchgear, the switchgear including an input breaker;
wherein the output breaker and the input breaker are opened and closed by turning a key or a controller associated with the output breaker may receive a command to open or close.

14. The power system of claim 13, wherein the distributed energy resource and the switchgear each include a connector keyslot and a breaker keyslot.

15. A method comprising:
supplying a distributed energy resource, the distributed energy resource including an output breaker and a switchgear, the switchgear operatively coupled to the distributed energy resource by an interlock cable, the interlock cable in communication with the distributed energy source and the switchgear, the switchgear including an input breaker, wherein the output breaker and the input breaker may be opened and closed by turning a key, wherein the distributed energy resource and the switchgear each include a connector keyslot and a breaker keyslot;
placing the key in each connector keyslot;
connecting a power cable to the distributed energy resource and switchgear;
turning each key and removing each key from each connector keyslot;
placing each key in each breaker key slot; and
turning each key in each breaker key slot.

16. The method of claim 15, wherein removing each key from each connector keyslot is prevented until the power cable is detected as connected.

17. The method of claim 16, wherein after turning the each key in each breaker key slot is completed, capturing the key until the output breaker and input breaker are opened.

* * * * *